United States Patent
Lin et al.

(10) Patent No.: US 10,948,903 B2
(45) Date of Patent: *Mar. 16, 2021

(54) SYSTEM AND METHOD THAT CONSIDER TOOL INTERACTION EFFECTS FOR IDENTIFYING ROOT CAUSES OF YIELD LOSS

(71) Applicant: NATIONAL CHENG KUNG UNIVERSITY, Tainan (TW)

(72) Inventors: Chin-Yi Lin, Taipei (TW); Yu-Ming Hsieh, Kaohsiung (TW); Fan-Tien Cheng, Tainan (TW)

(73) Assignee: NATIONAL CHENG KUNG UNIVERSITY, Tainan (TW)

(*) Notice: Subject to any disclaimer, the term of this patent is extended or adjusted under 35 U.S.C. 154(b) by 230 days.

This patent is subject to a terminal disclaimer.

(21) Appl. No.: 16/219,970

(22) Filed: Dec. 14, 2018

(65) Prior Publication Data
US 2019/0354094 A1    Nov. 21, 2019

Related U.S. Application Data

(60) Provisional application No. 62/672,591, filed on May 17, 2018.

(30) Foreign Application Priority Data

Nov. 15, 2018  (TW) .................................. 107140645

(51) Int. Cl.
*G06F 19/00* (2018.01)
*G05B 19/418* (2006.01)
*G06F 16/2457* (2019.01)
*G05B 23/02* (2006.01)

(52) U.S. Cl.
CPC ... *G05B 19/41875* (2013.01); *G05B 19/4184* (2013.01); *G05B 19/41845* (2013.01); *G05B 23/0281* (2013.01); *G06F 16/24578* (2019.01)

(58) Field of Classification Search
CPC .......... G05B 19/41875; G05B 19/4184; G05B 19/41845; G05B 23/0281;
(Continued)

(56) References Cited

U.S. PATENT DOCUMENTS

| | | | | |
|---|---|---|---|---|
| 6,272,391 B1* | 8/2001 | Maturana | ......... | G05B 19/41865 700/103 |
| 7,494,893 B1* | 2/2009 | Inani | ................ | G05B 19/41875 438/424 |

(Continued)

FOREIGN PATENT DOCUMENTS

| | | |
|---|---|---|
| JP | 2017502500 A | 1/2017 |
| TW | 201020806 A | 6/2010 |
| TW | 201729024 A | 8/2017 |

OTHER PUBLICATIONS

Ching-Kang Ing et al., "A Stepwise Regression Method and Consistent Model Selection for High-Dimensional Sparse Linear Models," http://dx.doi.org/10.5705/ss.2010.081, Statistica Sinica, vol. 21, No. 4, Oct. 2011, pp. 1473-1513.

(Continued)

*Primary Examiner* — Zhipeng Wang
(74) *Attorney, Agent, or Firm* — CKC & Partners Co., LLC

(57) ABSTRACT

Embodiments of the present disclosure provide a two-phase process for searching root causes of a yield loss in a production line. In a first phase, an interaction between two process tools, that between two parameters, or that between one process tool and one parameter that is likely to cause the yield loss is identified. In a second phase, a threshold of the parameter that is likely to cause the yield loss and is obtained from the first phase is identified. In each phase, two different algorithms can be used to generate a reliance index ($RI_I$) for gauging the reliance levels of their search results.

15 Claims, 9 Drawing Sheets

(58) Field of Classification Search
CPC .... G05B 2219/31356; G06F 16/24578; G06Q 10/063; G06Q 50/04
See application file for complete search history.

(56) References Cited

U.S. PATENT DOCUMENTS

| | | |
|---|---|---|
| 8,095,484 B2 | 1/2012 | Cheng et al. |
| 2013/0006406 A1 | 1/2013 | Aharoni et al. |
| 2017/0153630 A1* | 6/2017 | Cheng ................ G05B 19/4184 |

OTHER PUBLICATIONS

Robert Tibshirani, "Regression Shrinkage and Selection via the Lasso," Journal of the Royal Statistical Society, Series B (Methodological), vol. 58, Issue 1, pp. 267-288, 1996.
Trevor Hastie et al., "The Elements of Statistical Learning: Data Mining, Inference, and Prediction," Second Edition (Springer Series in Statistics), Feb. 2009.
Argon Chen et al., "Sample-Efficient Regression Trees (SERT) for Semiconductor Yield Loss Analysis," IEEE Transactions on Semiconducotr Manufactruing, vol. 23, No. 3, Aug. 2010, pp. 358-369.
Dan Port et al., "Practicing What is Preached: 80-20 Rules for Strategic IV&V Assessment," 1-4244-2537-2/08/$20.00 c2008 IEEE, pp. 45-54.
Mangkholien Singson et al., "Implication of 80/20 Rule in Electronic Journal Usage of UGC-Infonet Consortia," The Journal of Academic Librarianship, vol. 41, Issue 2, Mar. 2015, pp. 207-219.
Fan-Tien Cheng et al, "A Scheme of High-Dimensional Key-Variable Search Algorithms for Yield Improvement", IEEE Robotics and Automation Letters, vol. 2, No. 1, Jan. 2017, pp. 179-186.

* cited by examiner

SYSTEM AND METHOD THAT CONSIDER TOOL INTERACTION EFFECTS FOR IDENTIFYING ROOT CAUSES OF YIELD LOSS

RELATED APPLICATIONS

This application claims priority to Taiwan Application Serial Number 107140645, filed Nov. 15, 2018 and U.S. provisional Application Ser. No. 62/672,591, filed May 17, 2018, which are herein incorporated by reference.

BACKGROUND

Field of Invention

The present disclosure relates to a system and a method for identifying root causes of a yield loss. More particularly, the present disclosure relates to a system and a method that consider interaction effects between process tools for identifying root causes of a yield loss.

Description of Related Art

Yield enhancement becomes the crucial indicator of enterprise profits, especially in research-and-development (R&D) and mass production phases. Product yield directly affects production cost. Manufacturers all seek to quickly enhance the product yield during development and mass-production phases. In other words, when a yield loss occurs, its root causes should be found rapidly in both the development and mass-production phases. When the yield loss is encountered, a conventional yield enhancement approach is to collect all production-related data to perform a big data analysis in order to find out the root causes causing the yield loss and remedy them. However, the amount of production-related data is often enormous and complicated, and thus it is very difficult to search for the root causes of the yield loss from production-related data.

With the advancement of semiconductor and thin film transistor-liquid crystal display (TFT-LCD) manufacturing technologies, their manufacturing processes are becoming more and more sophisticated. As a result, how to maintain feasible production yield of these sophisticated manufacturing processes becomes an essential issue. A yield management system aims to enhance product yield. However, the number of workpieces is small at the research-and-development (RD) and ramp-up phases, which makes the yield management system hard to find out the root causes of defects among all production tools. Thus, how to find out the key process parameters of the defective process tools causing the yield loss among numerous production tools with limited workpiece samples is a widely concerned issue. This challenge is the so-called high-dimensional variable selection problem, which is also denoted as the issue of p>>n, in which "p" represents the number of explanatory process-related parameters of the process tools in the semiconductor or TFT-LCD process, and "n," on the other hand, is the sampling number of end products (processed workpieces) in the semiconductor or TFT-LCD process.

SUMMARY

An object of the present disclosure is to provide a method and a system for identifying interaction effects between process tools or parameters that cause a yield loss in a production line, and comparing if the process tools or the parameters with the interaction effects have more impact on the yield loss than the process tools or the process parameters themselves do, thereby determining if the interactions between the process tools or the parameters need improvements for enhancing production yield.

Another object of the present disclosure is to a system and a method for identifying threshold values of a process parameter that effect production yield, thereby enhancing the production yield.

According to the aforementioned objects, a method for identifying root causes of a yield loss is provided. In the method, a production line is provided and includes process stages, each of the process stages including process tools, each of the process tools including at least one process device, each of the at least one process device having process parameters configured for processing one of workpieces. Inter-tool parameters between the process tools are identified, in which each of the inter-tool parameters represents an interaction between two of the process tools. The workpieces are processed according to production routes respectively, each of the production routes indicating a predetermined device of the process devices of the process tools in the process stages for processing one of the workpieces. Metrology is performed on each of the workpieces after being processed by its corresponding predetermined device, thereby obtaining plural sets of in-line metrology values corresponding to the workpieces. At least one yield test is performed on each of the workpieces after passing through the production line, thereby obtaining plural sets of final inspection values corresponding to the workpieces respectively. A step is performed to determine if a yield test failure is encountered according to the sets of final inspection values. A first phase is performed when the yield test failure is encountered. In the first phase, a first searching model is prepared based on a first algorithm, in which the first algorithm is a triple phase orthogonal greedy algorithm (TPOGA), a least absolute shrinkage and selection operator (LASSO) algorithm or a regression tree algorithm. A set of interaction data is obtained indicating whether the workpieces pass through or are produced by using both of any two elements of a first assembly consisting of the process devices, the process parameters and the inter-tool parameters, according to the production routes, the process parameters and the inter-tool parameters. at least one first key process device, and/or at least one first key process parameter, and/or at least one first key inter-tool parameter, and/or at least one first key interaction that are likely to cause the yield test failure are identified by feeding the sets of final inspection values of the workpieces, the sets of in-line metrology values of the workpieces, the production routes of the workpieces, the process parameters, the inter-tool parameters, the set of interaction data into the first searching model. When the result of identifying is good, at least one updated configuration is sent to the at least one first key process device or devices related to the at least one first key process parameter, the at least one first key inter-tool parameter or the at least one first key interaction for continuous improvements of yield of the production line.

In some embodiments, in the first phase, a second searching model is prepared based on a second algorithm that is different from the first algorithm, in which the second algorithm is the triple phase orthogonal greedy algorithm (TPOGA), the least absolute shrinkage and selection operator (LASSO) algorithm or the regression tree algorithm. At least one second key process device, and/or at least one second key process parameter, and/or at least one second key inter-tool parameters, and/or at least one second key interaction that are likely to cause the yield test failure are identified by feeding the sets of final inspection values of the workpieces, the sets of in-line metrology values of the workpieces, the production routes of the workpieces, the process parameters, the inter-tool parameters, the set of interaction data into the second searching model. The at least one first key process device, and/or the at least one first key process device, and/or the at least one first key inter-tool parameters, and/or the at least one first key interaction are ranked and scored, thereby obtaining a first ranking list. The at least one second key process device, and/or the at least one second key process device, and/or the at least one second key inter-tool parameters, and/or at least one second key interaction are ranked and scored, thereby obtaining a second ranking list. Similarities of between the first ranking list and the second ranking list are compared, thereby obtaining a first reliance index to gauge a reliance level of identified results. In a condition that the first reliance index is greater than a first threshold, at least one updated configuration is sent to the at least one first key process device or devices related to the at least one first process parameter, the at least one first key inter-tool parameter or the at least one first key interaction for continuous improvements of yield of the production line.

In some embodiments, in the method, after the first phase, a second phase is performed. In the second phase, a first parameter is selected from a second assembly consisting of the at least one first key process parameter and the at least one first key inter-tool parameter, the first parameter having plural values used for processing the parameters. Each of the values of the first parameter is used as a reference value to obtain a set of threshold data indicating whether the values of the first parameter are greater than or equal to the reference value. First threshold values of the first parameter that are likely to cause the yield test failure are identified by feeding the sets of final inspection values of the workpieces, the sets of in-line metrology values of the workpieces, and the set of threshold data into the first searching model. When the result of identifying the first threshold values of the first parameter is good, the at least one updated configuration is provided based on the first threshold values.

In some embodiment, in the second phase, a second searching model is further prepared based on a second algorithm that is different from the first algorithm, in which the second algorithm is the triple phase orthogonal greedy algorithm (TPOGA), the least absolute shrinkage and selection operator (LASSO) algorithm or the regression tree algorithm. Second threshold values of the first parameter that are likely to cause the yield test failure are identified by feeding the sets of final inspection values of the workpieces, the sets of in-line metrology values of the workpieces, and the set of threshold data into the second searching model. The first threshold values of the first parameter are ranked and scored. The second threshold values of the first parameter are ranked and scored. Similarities of rankings between the first threshold values and the second threshold values are compared, thereby obtaining a second reliance index to gauge a reliance level of identified results. In a condition that the second reliance index is greater than a second threshold, the at least one updated configuration is provided based on the first threshold values.

In some embodiments, the metrology performed on each of the workpieces is virtual metrology.

According to the aforementioned objects, another method for identifying root causes of a yield loss occurring in a production line is provided. The production line includes process stages, each of the process stages including at least one process tool, each of the at least one process tool including at least one process device, each of the at least one process device having process parameters configured for processing one of workpieces. The method includes identifying inter-tool parameters between the process tools, in which each of the inter-tool parameters represents an interaction between two of the process tools; obtaining production routes each of which indicates a predetermined device of the process devices of the process tools in the process stages for processing one of the workpieces; receiving plural sets of in-line metrology values of the workpieces, in which the sets of in-line metrology values are obtained by performing metrology on the workpieces after being processed by their predetermined devices; receiving plural sets of final inspection values corresponding to the workpieces, in which the sets of final inspection values are obtained by performing at least one yield test on each of the workpieces after passing through the production line; determining if a yield test failure is encountered according to the final inspection values; performing a first phase when the yield test failure is encountered. The first phase includes preparing a first searching model based on a first algorithm, in which the first algorithm is a triple phase orthogonal greedy algorithm (TPOGA), a least absolute shrinkage and selection operator (LASSO) algorithm or a regression tree algorithm; obtaining a set of interaction data indicating whether the workpieces pass through or are produced by using both of any two elements of a first assembly consisting of the process devices, the process parameters and the inter-tool parameters, according to the production routes, the process parameters and the inter-tool parameters; and identifying at least one first key process device, and/or at least one first key process parameter, and/or at least one first key inter-tool parameter, and/or at least one first key interaction that are likely to cause the yield test failure by feeding the sets of final inspection values of the workpieces, the sets of in-line metrology values of the workpieces, the production routes of the workpieces, the process parameters, the inter-tool parameters, the set of interaction data into the first searching model. Thereafter, when the result of identifying is good, the method includes sending at least one updated configuration to the at least one first key process device or devices related to the at least one first key process parameter, the at least one first key inter-tool parameter or the at least one first key interaction for continuous improvements of yield of the production line.

In some embodiment, after the first phase, a second phase is performed. The second phase includes selecting a first parameter from a second assembly consisting of the at least one first key process parameter and the at least one first key inter-tool parameter, the first parameter having plural values used for processing the parameters; using each of the values of the first parameter as a reference value to obtain a set of threshold data indicating whether the values of the first parameter are greater than or equal to the reference value; identifying first threshold values of the first parameter that are likely to cause the yield test failure by feeding the sets of final inspection values of the workpieces, the sets of in-line metrology values of the workpieces, and the set of threshold data into the first searching model. Thereafter, when the result of identifying the first threshold values of the first parameter is good, the method includes providing the at least one updated configuration based on the first threshold values.

According to the aforementioned objects, a system for identifying root causes of a yield loss occurring in a production line is provided. The production line includes process stages, each of the process stages including at least one process tool, each of the at least one process tool including at least one process device, each of the at least one process device having process parameters configured for processing one of workpieces, in which there are inter-tool parameters between the process tools, each of the inter-tool parameters representing an interaction between two of the process tools. The system includes a memory and a process. the memory is configured to store production information and plural sets of final inspection values corresponding to the workpieces, the production information including production routes, values of the process parameters, values of the inter-tool parameters and plural sets of in-line metrology values of the workpieces, in which each of the production routes indicates a predetermined device of the process devices of the process tools in the process stages for processing one of the workpieces, the sets of in-line metrology values are obtained by performing metrology on the workpieces promptly after being processed by their predetermined devices, and the sets of final inspection values are obtained by performing at least one yield test on each of the workpieces after passing through the production line. The processor is configured to determine if a yield test failure is encountered according to the final inspection values; and perform a first phase when the yield test failure is encountered. The first phase includes preparing a first searching model based on a first algorithm, in which the first algorithm is a triple phase orthogonal greedy algorithm (TPOGA), a least absolute shrinkage and selection operator (LASSO) algorithm or a regression tree algorithm; obtaining a set of interaction data indicating whether the workpieces pass through or are produced by using both of any two elements of a first assembly consisting of the process devices, the process parameters and the inter-tool parameters, according to the production routes, the process parameters and the inter-tool parameters; and identifying at least one first key process device, and/or at least one first key process parameter, and/or at least one first key inter-tool parameter, and/or at least one first key interaction that are likely to cause the yield test failure by feeding the sets of final inspection values of the workpieces, the sets of in-line metrology values of the workpieces, the production routes of the workpieces, the process parameters, the inter-tool parameters, the set of interaction data into the first searching model. When the result of identifying is good, the processor is configured to send at least one updated configuration to the at least one first key process device or devices related to the at least one first key process parameter, the at least one first key inter-tool parameter or the at least one first key interaction for continuous improvements of yield of the production line.

In some embodiments, after the first phase, the processor configured to perform a second phase. The second phase including selecting a first parameter from a second assembly consisting of the at least one first key process parameter and the at least one first key inter-tool parameter, the first parameter having plural values used for processing the parameters; using each of the values of the first parameter as a reference value to obtain a set of threshold data indicating whether the values of the first parameter are greater than or equal to the reference value; identifying first threshold values of the first parameter that are likely to cause the yield test failure by feeding the sets of final inspection values of the workpieces, the sets of in-line metrology values of the workpieces, and the set of threshold data into the first searching model. When the result of identifying the first threshold values of the first parameter is good, the processor is configured to provide the at least one updated configuration based on the first threshold values.

Thus, with the application of the embodiments of the present disclosure, interaction effects between process tools or parameters that cause a yield loss in a production line are identified; the impact between the process tools or the parameters with the interaction effects on the production yield and the impacts from the process tools or the process parameters themselves are compared; threshold values of a process parameter that effect the production are identified, thereby enhancing the production yield by improving the interactions between the process tools or the parameters.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
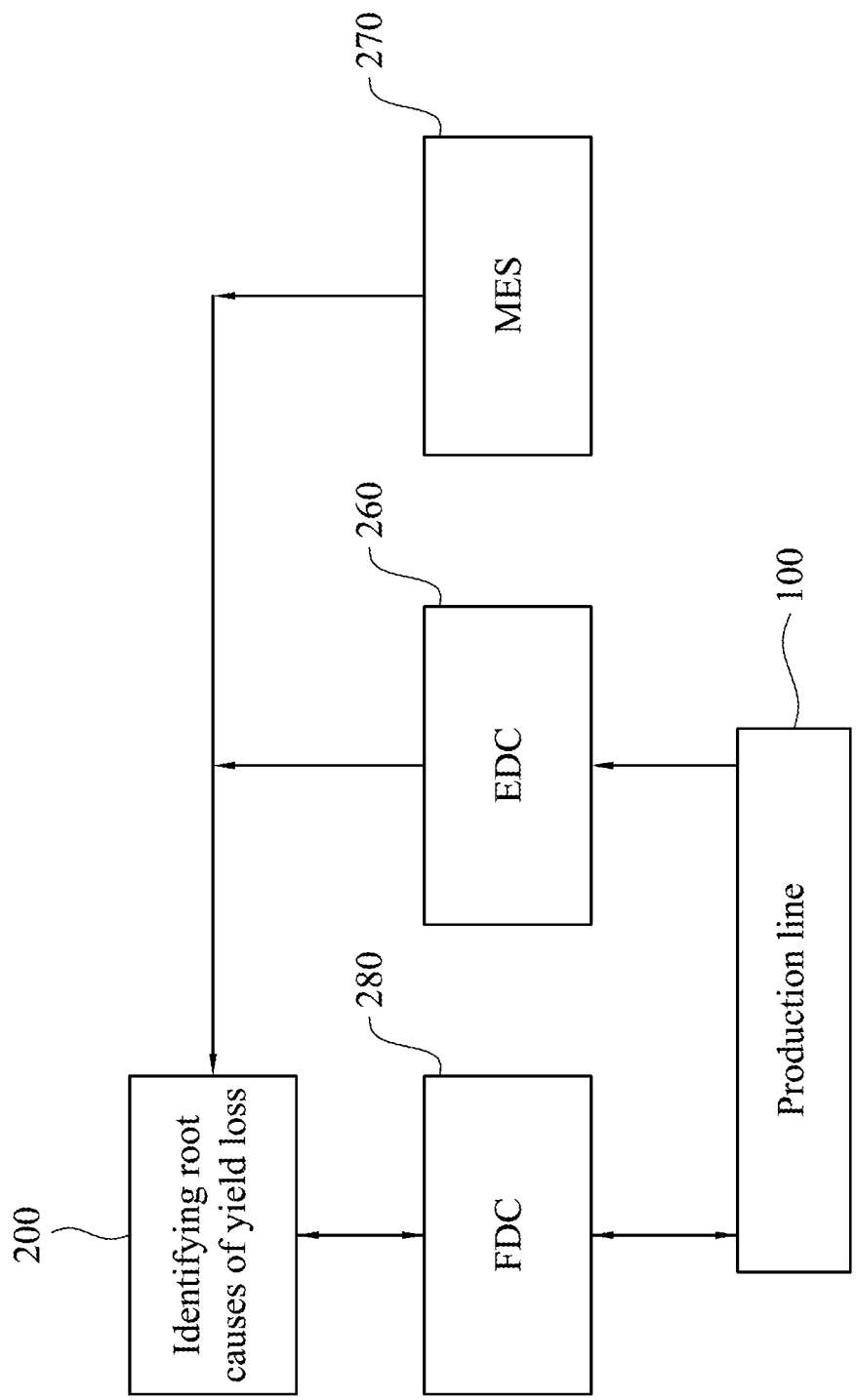
FIG. 1 is a schematic diagram showing a production system in accordance with some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

As manufacturing processes regarding semiconductor or TFT-LCD technologies are getting more and more complicated, an interaction between two process tools, two process parameters or one process tool and one process parameter has a significant influence on the production yield. When a step is performed for searching for critical factors affecting the production yield, if only process tools or process parameters themselves are searched, the searched result would be poor because the factors caused by the interaction effects between the process tools cannot be found, thus failing to effectively improve the production yield with respect to the root caused resulted from the interaction between the process tools.

On the other hand, even if the interaction between a process tool and a process parameter is found, it still cannot be known which threshold value of the process parameter would cause the yield loss. Thus, embodiments of the present disclosure provide a two-phase process for searching root causes of a yield loss in a production line. In a first phase, an interaction between two process tools, that between two parameters, or that between one process tool and one parameter that is likely to cause the yield loss is identified, and a step is performed to compare if the process tools or the process parameters with the interaction effects have more impact on the yield of the production yield than the process tools or the process parameters themselves do. If an interaction between two process tools exists and the interaction has more impact than the process tools themselves do, the improvement on the interaction will be more helpful for yield enhancement than the improvement on the process tools alone.

In a second phase, after the process tool or process parameter with the interaction effect (which will be defined as an inter-tool parameter later) is found, a threshold of the inter-tool parameter that is likely to cause the yield loss is further identified. The yield loss of the production line can be prevented by using the threshold to control the inter-tool parameter, thereby achieving yield enhancement. In each phase, two different algorithms can be used to generate a reliance index (RII) for gauging the reliance levels of their search results.

Referring to FIG. 1, FIG. 1 is a schematic diagram showing a production system in accordance with some embodiments of the present disclosure. In some embodiment, the production system includes a production line 100, a system 200 for identifying root causes of a yield loss of the production line 100, an engineering data collection (EDC) system 260, a manufacturing execution system (MES) 270, and a fault detection and classification (FDC) 280. The EDC system is configured to collect plural sets of in-line metrology values (y), defects (D), plural sets of final inspection values (Y) corresponding to workpieces that have been processed in the production line 100. The MES 330 is configured to store production routes ($X_R$) of the workpieces. The FDC 280 is configured to collect values of process parameters of respective process tools on the production line 100 and to monitor health states of the process tools, in which the values of process parameters are collected by sensors. The system 200 is configured to identify an interaction between two process tools, that between two parameters, or that between one process tool and one parameter that is likely to cause the yield loss, and a threshold of the interaction (inter-tool) parameter that is likely to cause the yield loss. After receiving the aforementioned information from the system 200, the FDC 280 provides updated configuration (such as parameter values) to the process tools on the production line 100 for yield enhancement.

Figure 2A:
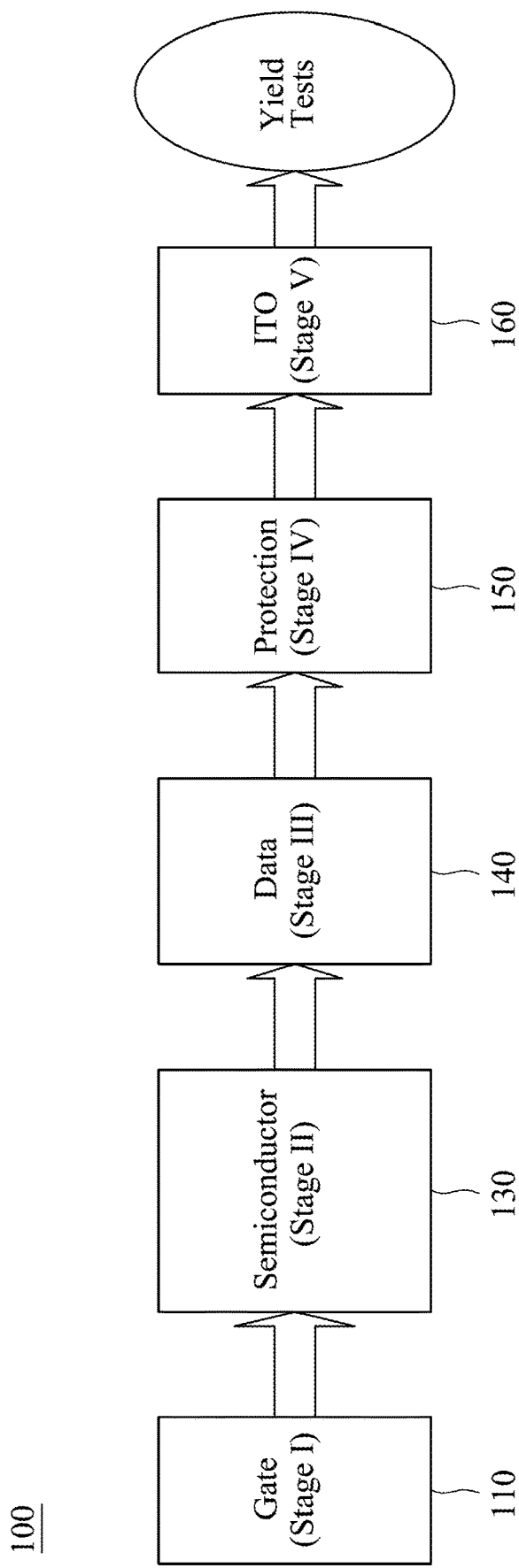
FIG. 2A is a schematic diagram showing a production line in accordance with some embodiments of the present disclosure.
Figure 2B:
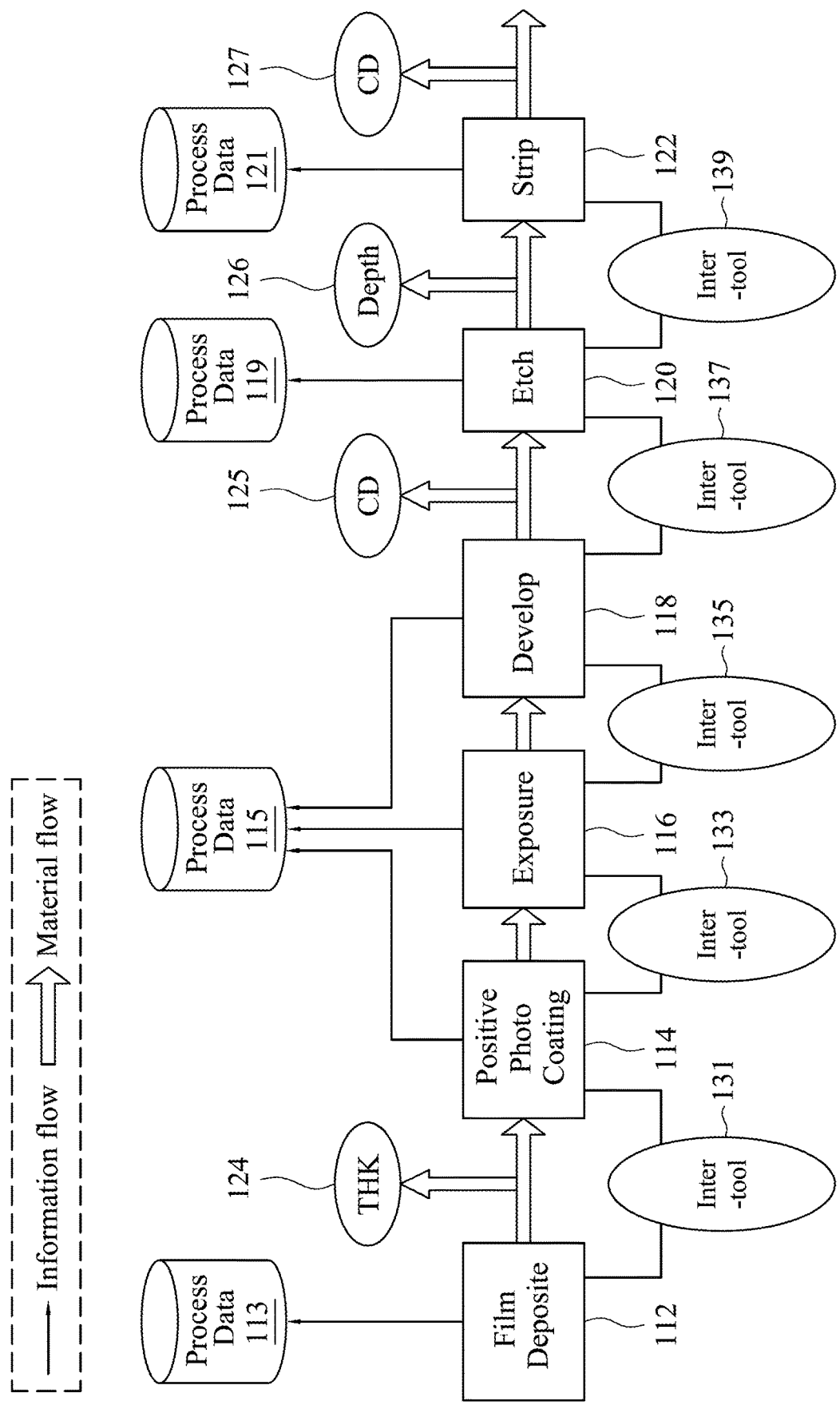
FIG. 2B is a schematic diagram showing exemplary process tool types in a process stage in accordance with some embodiments of the present disclosure.
Figure 2C:
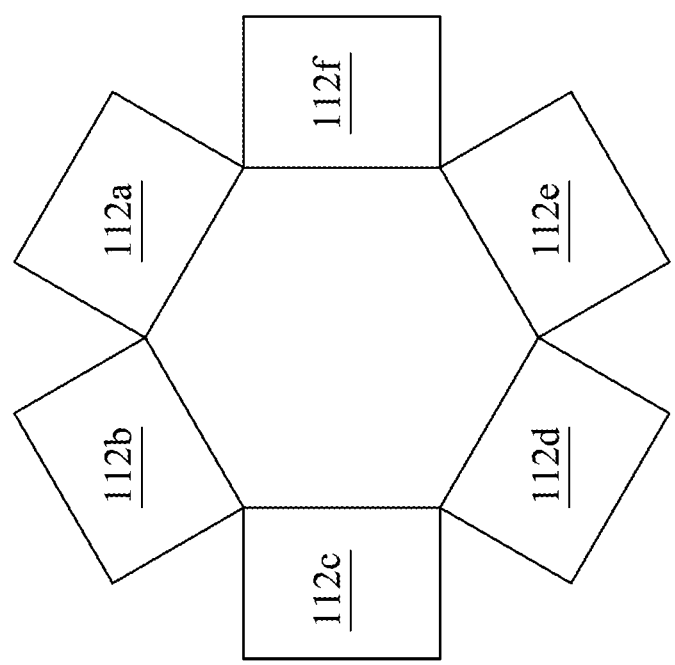
FIG. 2C is a schematic diagram showing an exemplary process tool in accordance with some embodiments of the present disclosure.

Referring to FIG. 2A to FIG. 2C, FIG. 2A is a schematic diagram showing a production line 100 in accordance with some embodiments of the present disclosure, in which a TFT process is illustrated as an example; FIG. 2B is a schematic diagram showing exemplary process tool types in a process stage in accordance with some embodiments of the present disclosure, in which a gate layer is illustrated as an example; and FIG. 2C is a schematic diagram showing an exemplary process tool in accordance with some embodiments of the present disclosure, in which a deposition tool is illustrated as an example.

Embodiments of the present disclosure are directed to identifying root causes of a yield loss occurring in the production line 100 including process stages 110, 130, 140, 150 and 160, in which each of the process stages 110, 130, 140, 150 and 160 includes process tools 112, 114, 116, 118, 120 and 122 respectively, as shown in FIG. 1B. Each of the process tools includes at least one process device. For example, the process tool includes process devices 112a, 112b, 112c, 112d, 112e and 112f, as shown in FIG. 1C.

For example in a TFT-LCD plant, the production line 100 may be built for performing a TFT process, and the process stages 110 (stage I), 130 (stage II), 140 (stage III), 150 (stage IV) and 160 (stage V) may be gate, semiconductor, data, protection, and indium tin oxide (ITO) layers. The gate layer (process stage 110) includes process tools for the so-called photo engraving processes (PEP), the process tools belonging to respective process tool types such as film deposition (the process tool 112), positive photoresist coating (the process tool 114), exposure (the process tool 116), developing (the process tool 118), etching (the process tool 120), and stripping (the process tool 122). Each of the process tools includes process devices (chambers) 112a, 112b, 112c, 112d, 112e and 112f. In production, each of workpieces pass through the process stages 110, 130, 140, 150 and 160 one after one, and finally receives final tests (yield tests), thereby obtaining plural sets of final inspection values corresponding to the workpieces respectively. Then, the sets of final inspection values are used to determine if a yield test failure is encountered. Yield tests may encounter Type 1-Type 10 yield losses that are resulted from various defects caused by electric-test failures, particles, etc. The yield tests may include a particle test or a pin-hole test on the workpiece which has been processed by the production line 100. The particle test is used to detect the particles falling on circuits and resulting in short circuits. The pin-hole test is used to detect the film uniformity caused by impurities on the surface of the workpiece in ITO sputtering. These defects may be identified by an automatic optical inspection (AOI) device. For example, a workpiece has type-1 and typ-3 defects (the type-1 defect is a particle defect, and the type-2 defect is a pin-hole defect, and the yield test result of the workpiece regarding type 1-type 10 defects is [1 0 1 0 0 0 0 0 0 0]. When the yield test results of the workpieces accumulate too many defects, the production line 100 encounters a "yield test failure".

At each of the process stages 110, 130, 140, 150 and 160, each workpiece is processed by the process tools 112, 114, 116, 118, 120 and 122 one after one, and each workpiece is only processed in one process device of each of the process tools. After being processed by a predetermined process device of the process tool 112, 114, 116, 118, 120 or 122, metrology is performed on each workpiece, thereby obtaining plural sets of in-line metrology values corresponding to the workpieces, in which the metrology may be actual measurements by metrology tools or virtual metrology, such as in-line metrology values 124 (thickness), 125 (critical dimension), 126 (depth) and 127 (critical dimension) shown in FIG. 1B. While each workpiece is processed in a process device, values of process parameters are collected by for example sensors, such as process data 113, 115, 119 and 121 shown in FIG. 2B. There is at least one inter-tool parameter 131 between the process tools 112 and 114, there is at least one inter-tool parameter 133 between the process tools 114 and 116, there is at least one inter-tool parameter 135 between the process tools 116 and 118, there is at least one inter-tool parameter 137 between the process tools 118 and 120, and there is at least one inter-tool parameter 139 between the process tools 120 and 122. The inter-tool parameters 131, 133, 135, 137 and 139 are used to control the process between two process tools, such as "queue time (Q-Time): between two process tools, and embodiments of the present disclosure are not limited thereto. The Q-Time presents a period of waiting time for the workpiece to enter a next process tool after being processed and leaving a process tool.

Figure 3:
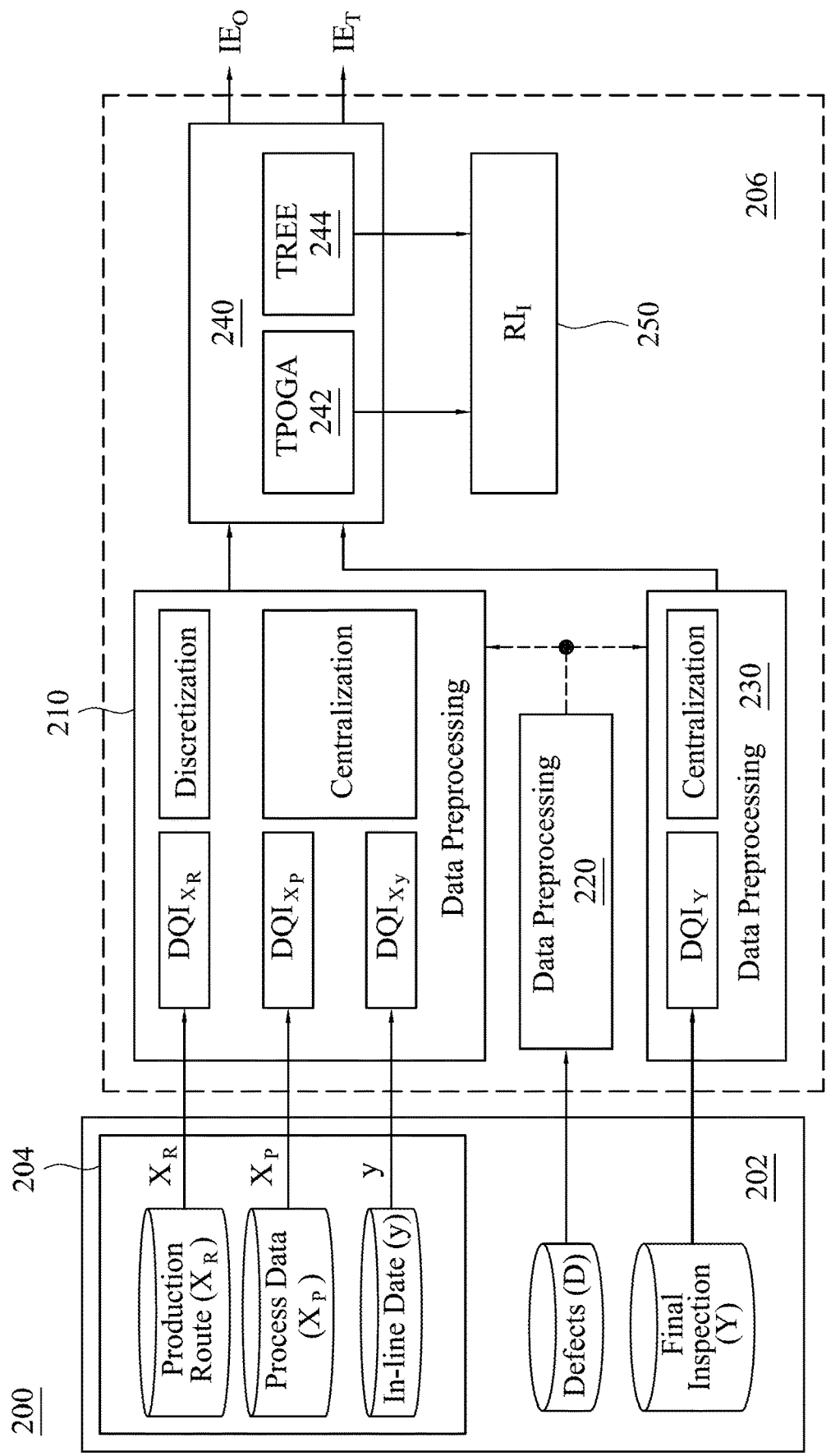
FIG. 3 is a schematic diagram showing a system for identifying root causes of a yield loss in accordance with some embodiments of the present disclosure.

Referring to FIG. 3, FIG. 3 is a schematic diagram showing a system 200 for identifying root causes of a yield loss in accordance with some embodiments of the present disclosure. The system 200 includes a memory 202 and a processor 206. The processor 206 may include any type of processor, microprocessor, or processing logic that may interpret and execute instructions (e.g., a field programmable gate array (FPGA)). The processor 206 may include a single device (e.g., a single core) and/or a group of devices (e.g., multi-core). The memory 202 may include a random access memory (RAM) or another type of dynamic storage device that may store information and instructions for execution by the processor 206. The memory 202 may also be used to store temporary variables or other intermediate information during execution of instructions by the processor 200. The production information 204, the defects (D) and the sets of final inspection values (Y) will be loaded to the memory 202 for execution by the processor 206.

The memory 202 stores production information 204, defects (D) and plural sets of final inspection values (Y) corresponding to the workpieces after being processed in the production line 100 (FIG. 2A). The production information includes production routes ($X_R$) of the workpieces, values of the process data ($X_P$) and plural sets of in-line metrology values (y) of the workpieces, in which the process data ($X_P$) include process parameters and inter-tool parameters, and may be obtained by the FDC system 200 in FIG. 1, for example. Each of the production routes indicates a predetermined device of the process devices of the process tools in the process stages for processing one of the workpieces, such as "the process device 112a of the process tool 112 at the process stage 110" as shown in FIG. 2A to FIG. 2C. The production routes may be obtained by the MES system 270 in FIG. 1, for example. The sets of in-line metrology values (y) are obtained by performing metrology on the workpieces promptly after being processed by their predetermined devices, and the sets of final inspection values are obtained by performing at least one yield test on each of the workpieces after passing through the production line. Defects (D) could happen in any production stage, thus they are also imported for analysis. Then, the processed D may join the production information 204 or the final inspection values (Y) depending on the nature of D. The sets of in-line metrology values (y), the defects (D) and the final inspection values (Y) may be obtained by the EDC system 260 in FIG. 1, for example. The outputs of a root-cause searching step 240 are the search result of triple phase orthogonal greedy algorithm (TPOGA) 242: $IE_O$ and that of that of regression tree algorithm (TREE) 244: $IE_T$, and their accompanying reliance index: $RI_K$. In some embodiments, a least absolute shrinkage and selection operator (LASSO) may be used to replace the TPOGA 242 or TREE 244. It is noted that the root-cause searching step 240 uses two different algorithms, such as TPOGA/LASSO, TPOGA/TREE, or LASSO/TREE. Hereinafter, TPOGA, LASSO and TREE are described.

The greedy algorithm is a stepwise regression method that considers the correlation between all the causing parameters (X) and the final inspection results (Y). In embodiments of the present disclosure, X includes all the related variables of production: $X_R$, $X_P$, and y; while Y represents the final inspection results (values). Pure greedy algorithm (PGA) and orthogonal greedy algorithm (OGA) can be used herein for solving the high-dimensional regression problem. However, OGA performs better than PGA in high-dimensional linear regression. In embodiments of the present disclosure, the processes of OGA, High-Dimensional Information Criterion (HDIC), and Trimming are combined to form the so-called TPOGA. Details of TPOGA used in embodiments of the present disclosure can be referenced to "A stepwise regression method and consistent model selection for high-dimensional sparse linear models" by C.-K. Ing and T. L. Lai, Statistica Sinica, vol. 21, pp. 1473-1513, 2011, which is hereby incorporated by reference, in which Ing and Lai discloses a termination condition, High-Dimensional Information Criterion (HDIC) to choose along the OGA path that has the smallest value of a suitably chosen criterion.

Unlike stepwise regression, LASSO is a shrinkage method which minimizes the residual sum of squares subject to the sum of the absolute value of the coefficients being less than a constant. Because of the nature of this constraint, it tends to produce some coefficients that are exactly zero and hence gives interpretable models. The significant difference between LASSO and the usual stepwise regression is that all the independent variables can be processed at the same time via LASSO but not the usual stepwise regression. Details of LASSO used in embodiments of the present disclosure can be referenced to "Regression shrinkage and selection via the LASSO" by R. Tibshirani, J. Royal Statistical Soc. B, vol. 58, no. 1, pp. 267-288, 1996, and "The elements of statistical learning: data mining, inference, and prediction" by Trevor Hastie, Robert Tibshirani and Jerome Friedman, Springer, New York, 2009, which are hereby incorporated by reference.

The regression tree algorithm used by the embodiments of the present disclosure may such as a sample-efficient regression trees (SERT) algorithm combines the methodologies of forward selection in regression analysis and regression tree. Compared to the conventional decision trees such as CART (classification and regression trees), SERT is able to handle combination effect in the so-called high-dimensional (p>>n) problem. Details of SERT used in embodiments of the present disclosure can be referenced to "Sample-efficient regression trees (SERT) for semiconductor yield Loss Analysis" by A. Chen and A. Hong, IEEE Transactions on Semiconductor Manufacturing, vol. 23, no. 3, August 2010, which is hereby incorporated by reference.

Figure 4A:
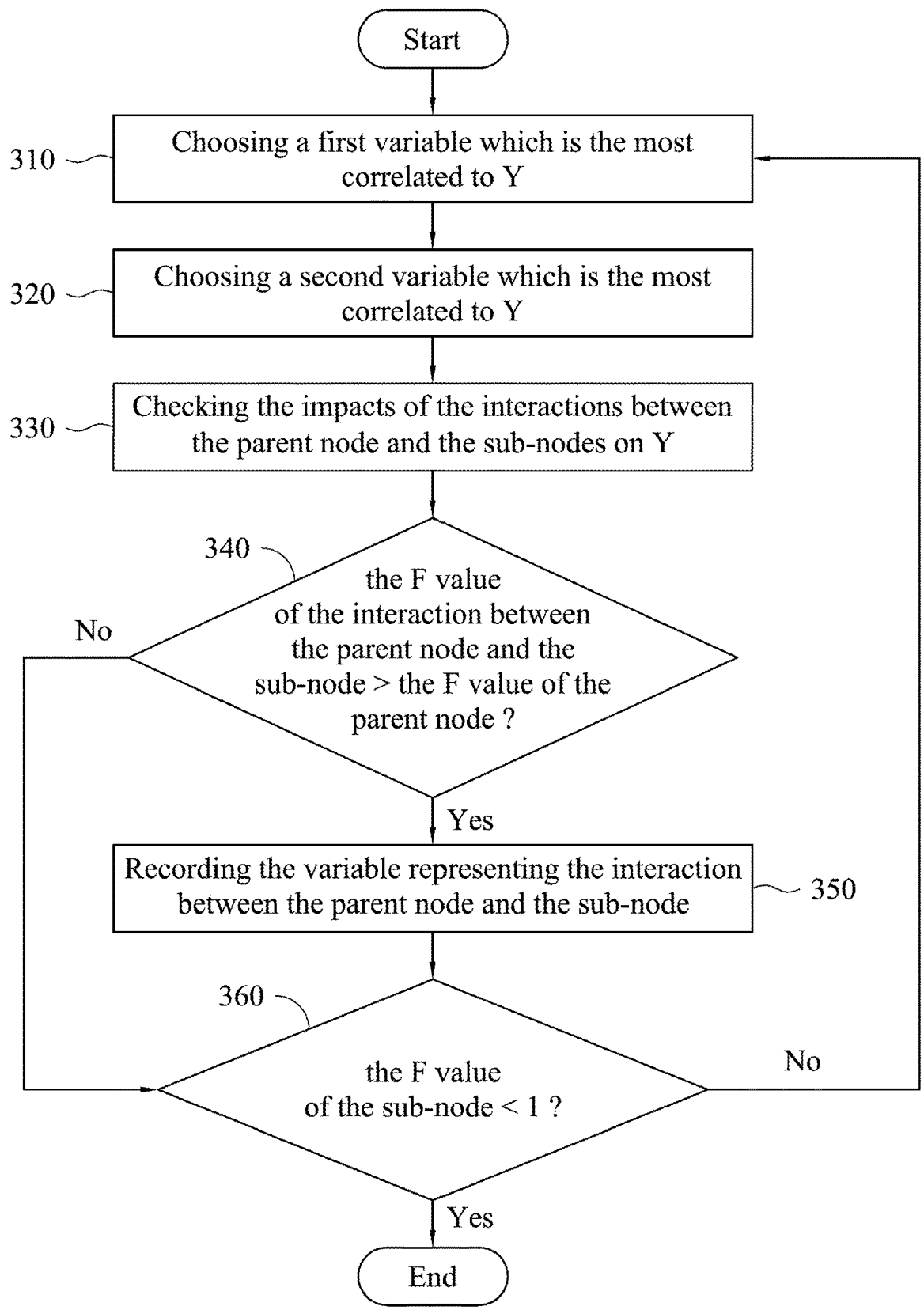
FIG. 4A and FIG. 4B show a schematic flow chart showing a regression tree algorithm in accordance with some embodiments of the present disclosure.
Figure 4B:
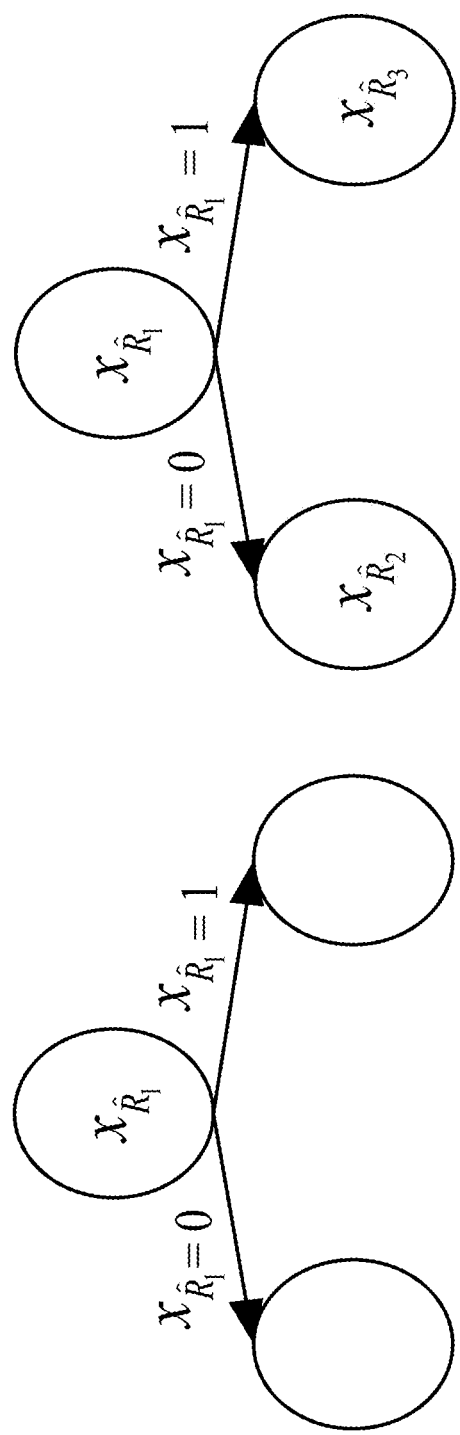

Hereinafter, the regression tree algorithm used in the embodiments of the present disclosure is explained. Referring to FIG. 4A and FIG. 4B, FIG. 4A and FIG. 4B show a schematic flow chart showing a regression tree algorithm in accordance with some embodiments of the present disclosure. As shown in FIG. 4A, step 310 is performed to choose a first variable from the production information as a parent node defined as $x_{\hat{R}_1}$, which is the most correlated to the final inspection values (Y), as shown in the left part of FIG. 4B. The first variable may be a process tool, a process parameter or an inter-tool parameter. Then, step 320 is performed to choose second variables from the production information except the first variable, and the second variables are the most correlated to the final inspection values (Y), in which the second variables that passes the first variable ($X_{\hat{R}_1}=1$) and does not pass the first variable ($x_{\hat{R}_1}=0$) are denoted as a left sub-node $x_{\hat{R}_2}$ and a right sub-node $x_{\hat{R}_3}$ as shown in the right part of FIG. 4B. Thereafter, step 330 is performed to check the impacts of the interactions between the parent node $x_{\hat{R}_1}$ and the respective sub-nodes $x_{\hat{R}_2}$ and $x_{\hat{R}_3}$ on the final inspection values (Y) with a partial-F test. When the F value ($F_{1,2}$ or $F_{1,3}$) of the interaction between the parent node $x_{\hat{R}_1}$ and the sub-nodes $x_{\hat{R}_2}$ or between the parent node $x_{\hat{R}_1}$ and the sub-node $x_{\hat{R}_3}$ is smaller than 1, it means that the impact of the interaction on the final inspection values (Y) is very small. When the F value ($F_{1,2}$ or $F_{1,3}$) is greater than or equal to 1, it means that the impact of the interaction on the final inspection values (Y) is significant, and the impact of the sub-node passing the parent node ($x_{\hat{R}_1}$=1) on the final inspection values (Y) is different from that of the sub-node not passing the parent node ($x_{\hat{R}_1}$=0) on the final inspection values (Y). Step 340 is performed to determine if the F value ($F_{1,2}$ or $F_{1,3}$) of the interaction between the parent node $x_{\hat{R}_1}$ and the sub-node $x_{\hat{R}_2}$ or between the parent node $x_{\hat{R}_1}$ and the sub-node $x_{\hat{R}_3}$ is greater than the F value of the parent node $x_{\hat{R}_1}$ (i.e. the impact of the parent node $x_{\hat{R}_1}$ on the final inspection values (Y)). When the result of step 340 is yes, step 350 is performed to record the variable representing the interaction between the parent node and the sub-node as a key variable. When the result of step 340 is no or after step 350, step 360 is performed to check if the F value of the sub-node (i.e. the impact of the sub-node on the final inspection values (Y)) is smaller than 1. When the result of step 360 is no, it means that the impact of the sub-node itself on the final inspection values (Y) is still significant, and step 310 is performed again to search for a sub-sub-node. When the result of step 360 is yes, it means that the impact of the sub-node itself on the final inspection values (Y) is very small and the searching ends.

As shown in FIG. 3, before performing the root-cause searching step 240, data preprocessing steps 210, 220 and 230 are required to be conducted to assure the data quality of all the inputs: production information ($X_R$, $X_P$, and y), defects (D), and final inspections (Y). The characteristics of these inputs are described below. $X_R$ needs to be discretized into 1 or 0, which indicates that the workpiece getting through this stage or not. $X_P$ contains data of tool process parameters (such as voltage, pressure, temperature, flow rate, etc.) and data of inter-tool parameters which need to be centralized. y stands for inline inspection data (such as critical dimension, thickness, etc.) which need to be centralized. As for D, different companies have different definitions of defects, and thus discussion with domain experts is required before executing data-preprocessing and quality check. Y stands for the yield test results (final inspection values) that should be centralized.

The data quality evaluation algorithm of $X_R$, denoted as a process data quality index ($DQIx_R$), evaluates the following facts: 1) while a process stage may contain several process tools of the same type, the process stage utilizes only one of the process tools; 2) if a production line should get through multiple process tools (such as three process tools) of the same process tool type, then the production line has three stages at which the three process tools are located respectively; 3) if a process tool is used in different production lines, the same device in a different production line would be considered as a different process stage; 4) there are only two possibilities for a workpiece passing through the process tool: get through ("1") or not ("0"); 5) a workpiece cannot get through any process tool that does not belong to that process stage. For example, when a workpiece is processed by process tools a and b of the same process tool type at a stage A, the process tool a is located at the stage A, but the process tool is designated to be at a stage B.

Similarly, the data quality evaluation algorithms of $X_P$ and y are denoted as $DQIx_P$, and $DQIx_y$, respectively. The data quality evaluation algorithm of Y is denoted as $DQI_Y$. Both $DQIx_P$, and $DQIx_y$, adopt the algorithms similar to the process data quality evaluation scheme utilized in U.S. Pat. No. 8,095,484 B2, and $DQI_Y$ also applies the algorithm similar to the metrology data quality evaluation scheme used in U.S. Pat. No. 8,095,484 B2. U.S. Pat. No. 8,095,484 B2 is hereby incorporated by reference.

The processor 206 is configured to determine if a yield test failure is encountered according to the final inspection values; and to perform the root-cause searching step 240 and step 250 for calculating a reliance index ($RI_T$) when the yield test failure is encountered. Steps 240 and 250 are divided into a first phase and a second phase for root causes of a yield loss of the production line 100. In a first phase, key process devices, key process parameters, and/or inter-tool parameters that are likely to cause the yield loss is identified. In a second phase, a threshold of a key process device, a key process parameter or a key inter-tool parameter that is likely to cause the yield loss and is obtained from the first phase is identified. In each phase, two different algorithms can be used to generate a reliance index ($RI_T$) for gauging the reliance levels of their search results.

In the first phase of the root-cause searching step 240, at first, a set of interaction data is obtained according to the production routes ($X_R$), the process parameters and the inter-tool parameters ($X_P$), the set of interaction data indicating whether the workpieces pass through or are produced by using both of any two elements of a first assembly consisting of the process devices, the process parameters and the inter-tool parameters. Hereinafter, an example is illustrated for explaining the formation of the set of interaction data.

Assuming there are two process devices k and l in the production line, the production routes $X_{Rk}$ and $X_{Rl}$ are shown as equations (1) and (2):

$$X_{Rk}=[x_{1Rk} x_{2Rk} \ldots x_{nRk}]^T \tag{1}$$

$$X_{Rl}=[x_{1Rl} x_{2Rl} \ldots x_{nRl}]^T \tag{2}$$

when $X_{nRk}$=1, it means that the production route of the $n^{th}$ workpiece passes through the process device k;

when $X_{nRk}$=0, it means that the production route of the $n^{th}$ workpiece does not pass through the process device k;

when $X_{nRl}$=1, it means that the production route of the $n^{th}$ workpiece passes through the process device l;

when $X_{nRl}$=0, it means that the production route of the $n^{th}$ workpiece does not pass through the process device l.

The set of interaction data $X_{Rkl}$ indicates whether the workpieces pass through both of the process device k and the process device l, such as equation (3) shown in the below.

$$X_{Rk1} = [x_{1Rk} \cdot x_{1Rl} \quad x_{2Rk} \cdot x_{2Rl} \quad \ldots \quad x_{nRk} \cdot x_{nRl}]^T \tag{3}$$

$$= [x_{1Rkl} \quad x_{2Rkl} \quad \ldots \quad x_{nRkl}]^T$$

when $X_{nRk}$=1, it means that the production route of the $n^{th}$ workpiece passes through both of the process device k and the process device l, and there is an interaction between the process device k and the process device l; and when $X_{nRk}$=0, it means that the production route of the $n^{th}$ workpiece does not pass through both of the process device k and the process device l or passes only one of them, and there is no interaction between the process device k and the process device l. Similarly, the above example is also applicable to the set of interaction data between two process parameters, between one process device and one process parameter, between one process device and one process tool, or between one process parameter and one process tool.

Then, by feeding the sets of final inspection values of the workpieces, the sets of in-line metrology values of the workpieces, the production routes of the workpieces, the process parameters, the inter-tool parameters, the set of interaction data into the first searching model, at least one first key process device, and/or at least one first key process parameter, and/or at least one first key inter-tool parameter, and/or at least one key interaction that are likely to cause the yield test failure are identified. The so-called "key interaction" means the impact between two process devices, that between two process parameters, that between one process device and one process parameter, that between one process device and one inter-tool parameter, or that between one process parameter and one inter-tool parameter.

In some embodiments, the root-cause searching step 240 is performed twice with two different algorithms such as TPOGA 242 and TREE 244 respectively, thereby performing step 250 for calculating a reliance index ($RI_I$) by comparing similarities of rankings between the results based on the TPOGA 242 and those based on the TREE 244. The reliance index ($RI_I$) is used to gauge a reliance level of identified results based on the TPOGA 242 and the TREE 244. By comparing the results of the TPOGA 242 and the TREE 244 and taking overlapping and weights into considerations, $RI_I$ is re-calculated and set between 0-1. With $RI_{IT}=0.7$ being the threshold, if $RI_I$ is greater than $RI_{IT}$, good search results are obtained; otherwise, the search results need to be re-examined. The step 250 for calculating a reliance index ($RI_I$) will be described later.

After the first phase, the second phase is performed. The second phase of the root-cause searching step 240 and step 250 for calculating a reliance index ($RI_I$) is used to obtain a threshold of a parameter that is likely to cause the yield loss and is obtained from the first phase, thereby tuning the process for yield enhancement; and uses two different algorithms to generate a reliance index ($RI_I$) for gauging the reliance level of the search result regarding the threshold. In the second phase, at first, a first parameter $X_w$ is selected from a assembly $\{X_1, X_2, \ldots, X_P\}$ consisting of the process parameter and the inter-tool parameter identified in the first phase, in which values $\{t_1, t_2, \ldots t_n\}$ of the first parameter $X_w$ are corresponding to n workpieces. Then, according to the values $\{t_1, t_2, \ldots, t_n\}$ of the first parameter $X_w$ used by the workpieces, each of the values $\{t_1, t_2, \ldots, t_n\}$ of the first parameter $X_w$ is used as a reference value $t_i$ to obtain a set of threshold data indicating whether the values $\{t_1, t_2, \ldots, t_n\}$ of the first parameter $X_w$ are greater than or equal to the reference value, such as shown by equation (4):

$$x_{w(\geq t_i)} = \begin{cases} 1, & \text{when } x_w \geq t_i \\ 0, & \text{otherwise} \end{cases}, 1 \leq t_i \leq n \quad (4)$$

The "greater than or equal to $t_i$" may be replaced by "smaller than or equal to $t_i$" according to actual requirements, meaning that the set of threshold data indicates if each of the values $\{t_1, t_2, \ldots, t_n\}$ is smaller than or equal to the reference number.

Thereafter, by feeding the sets of final inspection values (Y) of the workpieces, the sets of in-line metrology values (y) of the workpieces, and the set of threshold data into the first searching model, threshold values of the first parameter that are likely to cause the yield test failure are identified. Just as described above, the root-cause searching step 240 also may be performed twice with two different algorithms such as TPOGA 242 and TREE 244 respectively, thereby performing step 250 for calculating a reliance index ($RI_I$) regarding the threshold values.

Figure 5:
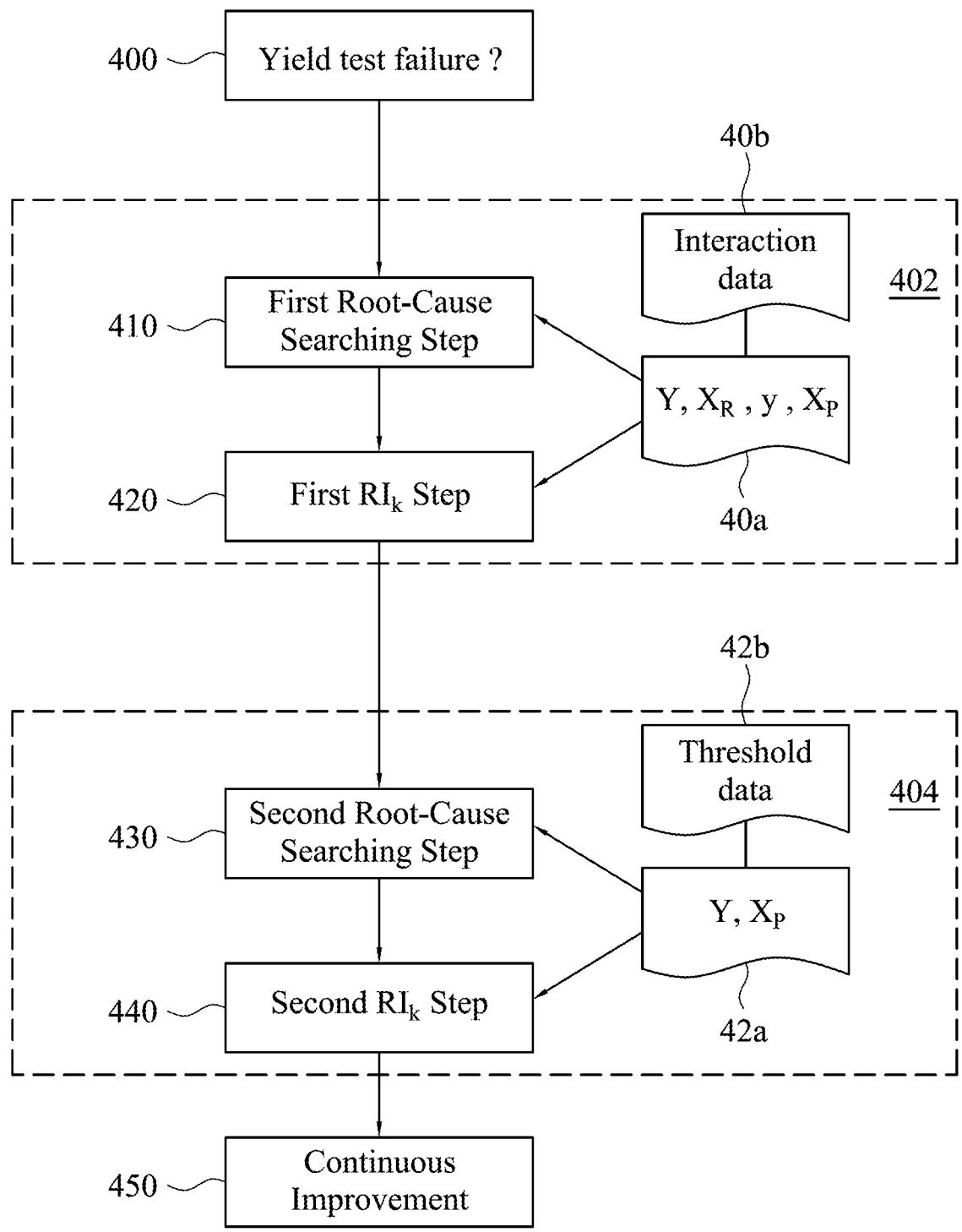
FIG. 5 is a schematic flow chart showing a method for identifying root causes of a yield loss in accordance with some embodiments of the present disclosure.

Referring to FIG. 5, FIG. 5 is a schematic flow chart showing a method for identifying root causes of a yield loss in accordance with some embodiments of the present disclosure. At first, step 400 is performed to determine if a yield test failure is encountered according to the sets of final inspection values (Y). When the yield test failure is encountered, a first phase 402 is performed. In the first phase 402, a first root-cause searching step 410 is performed for identifying which key process tool, and/or key process parameter, and/or inter-tool parameter is most likely to cause the yield test failure (yield loss). In the first root-cause searching step 410, a first searching model based on a first algorithm is first prepared, in which the first algorithm is a triple phase orthogonal greedy algorithm (TPOGA), a least absolute shrinkage and selection operator (LASSO) algorithm or a regression tree (TREE) algorithm, for example the TREE 244 shown in FIG. 3. Then, a set of data 40*a* is obtained, and includes the sets of final inspection values (Y), the production routes ($X_R$), the process data ($X_P$) and the sets of in-line metrology values (y) corresponding to the workpieces, in which the process data ($X_P$) include process parameters and inter-tool parameters. In some embodiments, the set of data 40*a* is used to obtain obtaining a set of interaction data 40*b* indicating whether the workpieces pass through or are produced by using both of any two elements of an assembly consisting of the process devices, the process parameters and the inter-tool parameters (such as shown in equation (3)). The set of data 40*a* and the set of second data 40*b* may be first fed into the first searching model, so as to identify at least one key process device, and/or at least one key process parameter, and/or at least one key inter-tool parameter, and/or at least one key interaction that is likely to cause the yield test failure.

In some embodiments, the set of data 40*a* may be first fed into the first searching model, so as to identify at least one first key process device, and/or at least one first key process parameter, and/or at least one first key inter-tool parameter that is likely to cause the yield test failure. Then, according to the production routes, and/or the at least one first key process device, and/or the at least one first key process parameter, and/or the at least one first key inter-tool parameter, another set of interaction data 40*b* is obtained for indicating whether the workpieces pass through or are produced by using both of any two elements of an assembly consisting of the at least one first key process device, the at least one first key process parameter and the at least one first key inter-tool parameter. Thereafter, the set of interaction data 40*b* and the set of data 40*a* corresponding to the at least one first key process device, and/or the at least one first key process parameter and/or the at least one first key inter-tool parameter are fed into the first searching model, so as to identify at least one second key process device, and/or at least one second key process parameter, and/or at least one second key inter-tool parameter that is likely to cause the yield test failure. After the first root-cause searching step 410 is completed, a first reliance index ($RI_I$) step 420 may be optionally performed to gauge the reliance level of the results of the first root-cause searching step 410 based on the first algorithm (for example, TREE).

In the first reliance index ($RI_K$) step 420, a second searching model based on a second algorithm is first prepared. The second algorithm is different from the first algorithm used in step 410, in which the second algorithm is the triple phase orthogonal greedy algorithm (TPOGA), the least absolute shrinkage and selection operator (LASSO)

algorithm or the regression tree (TREE) algorithm. Then, the set of first data 40 is fed into the second searching model, so as to identify at least one key process device, and/or at least one key process parameter, and/or at least one key inter-tool parameter, and/or at least one key interaction that is likely to cause the yield test failure. Thereafter, the at least one key process device, and/or the at least one key process parameter, and/or the at least one key inter-tool parameter, and/or the at least one key interaction obtained by the first searching model are ranked and scored, thereby obtaining a first ranking list. The at least one key process device, and/or the at least one key process parameter, and/or the at least one key inter-tool parameter, and/or the at least one key interaction obtained by the second searching model are ranked and scored, thereby obtaining a second ranking list. Since the sequential order of key process devices or parameters searched by the searching model is important as the key process devices or parameters chosen earlier matter more, weights are assigned not only according to the sequential order but also the 80-20 principle to ensure higher score goes to the crucial minority. As a result, the final scores become $$FS_I = \begin{cases} \dfrac{OS_I}{\sum_{i=1}^{3} OS_I} \times 0.8, \text{ when pick order is } 1, 2, 3. \\ \dfrac{OS_I}{\sum_{i=4}^{10} OS_I} \times 0.2, \text{ when pick order is } 4, 5, \ldots, 10 \end{cases} \quad (5)$$

where $OS_I$ is the original score and $FS_I$ is the final score with I=1, 2, ..., 10 being the pick order.

Embodiments of the present disclosure are not limited to the aforementioned 80-20 principle, and other scoring methods are also applicable to the embodiments of the present disclosure. Then, similarities of rankings (pick orders) between the first key process devices and the second key process devices are compared, thereby obtaining a first reliance index ($RI_I$) to gauge a reliance level of ranking orders of the first ranking list and the second ranking list. The rule of thumb of calculating $RI_I$ is explained below. If a certain key process device has been chosen by both TPOGA and TREE with the same sequential pick order, the score of this key process device is counted. Then, if a certain key process device has been chosen by both TPOGA and TREE with different sequential pick orders, the score of this key process device is also counted. Finally, if TPOGA and TREE pick out different key process devices without overlapping, the score of this variable is not counted. Therefore, $RI_I$ of the search results is calculated by $$RI_I = \sum_{i=1}^{10} \sum_{j=1}^{10} \left( \dfrac{FS_{Ri} + FS_{Oj}}{2} \right) \text{ if } R_i = O_j \quad (6)$$

where
$FS_{Oi}$ final score of $O_i$
$FS_{Lj}$ final score of $L_j$
$O_i$ $i^{th}$ pick process device or parameter obtained by the first searching model (TREE), $i = 1, 2, 3, \ldots, 10$
$L_j$ $j^{th}$ pick process device $r$ parameter obtained by the second searching model (TPOGA),
$j = 1, 2, 3, \ldots, 10$ After step 410 or step 420, a second phase 404 is performed. In the second phase, a second root-cause searching step 430 is performed to find out which parameters are likely to cause the yield loss. At step 430, at first, a first parameter is selected from the key process parameters and the key inter-tool parameters (a set of second data 42b). Then, according to plural values of the first parameter used by the workpieces, each of the values of the first parameter is used as a reference value to obtain a set of threshold data 42b (such as shown by equation (4)) indicating whether the values of the first parameter are greater than or equal to the reference value. Thereafter, by feeding the sets of final inspection values of the workpieces, the sets of in-line metrology values of the workpieces, and the set of threshold data 42b into the first searching model, first threshold values of the first parameter that are likely to cause the yield test failure are identified.

After the second root-cause searching step 430, a second reliance index ($RI_I$) step 440 may be optionally performed to gauge the reliance level of the results of the second root-cause searching step 430. In the second reliance index ($RI_I$) step 440, by feeding the sets of final inspection values of the workpieces, the sets of in-line metrology values of the workpieces, and the set of threshold data 42b into the second searching model, plural second threshold values of the first parameter that are likely to cause the yield test failure are identified. Then, the first threshold values of the first parameter are ranked and scored, and the second threshold values of the first parameter are ranked and scored. Thereafter, similarities of rankings between the first threshold values and the second threshold values are compared, thereby obtaining a second reliance index ($RI_I$) to gauge a reliance level of identified results.

Then, at step 450, when the identifying result of the first root-cause searching step 410 is good (for example, the first reliance index is greater than a first threshold), the FDC system 280 of FIG. 1 may send at least one updated configuration to the at least one key process device or devices related to the at least one key process parameter, the at least one key inter-tool parameter or the at least one key interaction for continuous improvements of yield of the production line. Moreover, when the identifying result of the second root-cause searching step 430 is good (for example, the second reliance index is greater than a second threshold), the FDC system 280 provides the at least one updated configuration based on the threshold values of the first parameter.

Hereinafter, a bumping process for semiconductor package manufacturing is adopted as an illustrative example for explaining embodiments of the present disclosure. The bumping process can be divided into a redistribution layer (RDL) process and an under bump metallurgy (UBM) layer process, each process consisting of sputtering, photo, plating, stripping, and etching stages.

Figure 6:
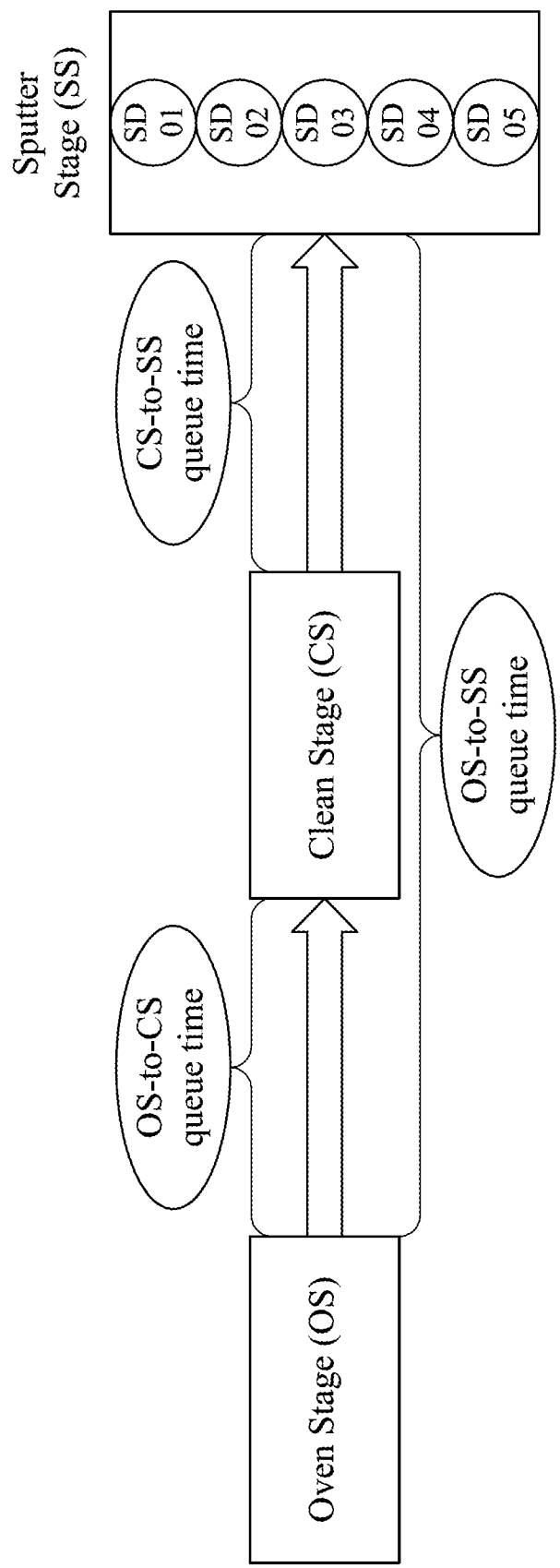
FIG. 6 is a block diagram for explaining a sputtering stage of a redistribution layer (RDL) process in accordance with some embodiments of the present disclosure.

The yield test of the bumping process is a resistance test. In this example, 431 lots (workpieces) are included for analysis (n=431). According to expert experience, high resistance usually happens in the Sputter Stage (SS) of the RDL layer due to the processing queuing time (Q-time) from the previous stages to the SS stage. Referring to FIG. 6, FIG. 6 is a block diagram for explaining the sputtering stage (SS) of the redistribution layer (RDL) process in accordance with some embodiments of the present disclosure. As shown in FIG. 6, before entering the sputtering stage (SS), each lot has to first pass through an oven stage (OS) and a clean stage (CS). There are 5 process devices SD01, SD02, SD03, SD04 and SD05, and 3 inter-tool parameters (i.e. OS-to-CS queue time, CS-to-SS queue time, OS-to-SS queue time).

In this example, the first phase is first performed. In the first phase, after the production routes of the 431 lots regarding 5 process devices SD01, SD02, SD03, SD04 and SD05, the sets of final inspection values of the 431 lots, the sets of in-line metrology values of the 431 lots, and values of the 3 inter-tool parameters of the 431 lots are fed into the TOPGA searching model and the LASSO searching model, the factors that are likely to cause the yield test failure are identified, which are key process tools SD01 and SD02, and a key inter-tool parameter "CS-to-SS queue time". As shown in Table 1, the ranking of importance for the factors causing the yield test failure is "key process tool SD01", "key process tool SD02" and "CS-to-SS queue time".

TABLE 1

| Ranking | TPOGA searching model | LASSO searching model |
|---------|----------------------|----------------------|
| 1 | SD01 | SD01 |
| 2 | SD02 | SD02 |
| 3 | OS-SS queue time | OS-SS queue time |
| ... | ... | ... |

Then, according the production routes and the inter-tool parameters, a set of interaction data is obtained for indicating whether the workpieces (lots) pass through or are produced by using both of any two elements of a assembly consisting of the key process device SD01, the key process device SD02 and the key inter-tool parameter "OS-SS queue time", i.e. whether each workpiece (lot) pass through or are produced by using SD01/SD02, SD01/"OS-SS queue time" or SD02/"OS-SS queue time". After values of the inter-tool parameter "OS-SS queue time" of the lots, the set of interaction data, the sets of final inspection values of the 431 lots, the sets of in-line metrology values of the 431 lots, the production routes of the lots passing through the process devices SD01/SD02 are fed into the TOPGA searching model and the TREE searching model, the factors that are likely to cause the yield test failure are identified, which are an interaction between SD01 and "OS-SS queue time", and the key process tools SD01 and SD02. As shown in Table 2, the ranking of importance for the factors causing the yield test failure is an interaction between SD01 and "OS-SS queue time", "key process tool SD01" and "key process tool SD02".

TABLE 2

| Ranking | TREE searching model | LASSO searching model |
|---------|---------------------|----------------------|
| 1 | an interaction between SD01 and "OS-SS queue time" | an interaction between SD01 and "OS-SS queue time" |
| 2 | SD01 | SD01 |
| 3 | SD02 | SD02 |
| ... | ... | ... |

As shown in Table 2, the identified results from the TREE searching model and the TPGA searching are the same, and their reliance index ($RI_f$) is 1 (greater than 0.7), and thus the results are good.

After the first phase, the second phase is performed, because having a significant impact on the yield, the interaction between SD01 and "OS-SS queue time" is selected for threshold analysis. In this example, there are 96 lots passing through the process device SD01, and thus there are 96 values of the "OS-SS queue time", which are {53.48, 3.67, 9.58, ..., 3.91, 8.92} (hours). Then, according to the values {53.48, 3.67, 9.58, ..., 3.91, 8.92} and by using each of the values as a reference value, a set of threshold data is obtained to indicate if each of the values {53.48, 3.67, 9.58, ..., 3.91, 8.92} is greater than or equal to the reference value. According to the aforementioned equation (4), when the reference value is "53.48", the values {53.48, 3.67, 9.58, ..., 3.91, 8.92} are converted to {1, 0, 0, ..., 0, 0}, in which "1" stands for the value is greater than or equal to the reference value, and "0" stands for the value is smaller than the reference value. Likewise, when the reference value is "3.67", the values {53.48, 3.67, 9.58, ..., 3.91, 8.92} are converted to {1, 1, 1, ..., 1, 1}, and when the reference value is "9.58", the values {53.48, 3.67, 9.58, ..., 3.91, 8.92} are converted to {1, 0, 1, ..., 0, 0}. The set of threshold data is shown as follows.

$$X_{OS-To-SS\ Q-time} = \begin{bmatrix} 53.48 \\ 3.67 \\ 9.58 \\ \vdots \\ \vdots \\ 3.91 \\ 8.92 \end{bmatrix}_{96 \times 1} \xrightarrow{Convert\ into}$$

$$\begin{bmatrix} x_{(\geq 53.48)} & x_{(\geq 3.67)} & x_{(\geq 9.58)} & \cdots & \cdots & x_{(\geq 3.91)} & x_{(\geq 8.92)} \\ 1 & 1 & 1 & \cdots & \cdots & 1 & 1 \\ 0 & 1 & 0 & \cdots & \cdots & 0 & 0 \\ 0 & 1 & 1 & \cdots & \cdots & 1 & 1 \\ \vdots & \vdots & \vdots & \vdots & \vdots & \vdots & \vdots \\ \vdots & \vdots & \vdots & \vdots & \vdots & \vdots & \vdots \\ 0 & 1 & 0 & \cdots & \cdots & 1 & 0 \\ 0 & 1 & 0 & \cdots & \cdots & 1 & 1 \end{bmatrix}_{96 \times 96}$$

After the sets of final inspection values of the 431 lots, the sets of in-line metrology values of the 431 lots, and the set of threshold data are fed into the TOPGA searching model and the TREE searching model, plural threshold values of $X_{OS-SS\ queue\ time}$ are identified as shown in Table 3.

TABLE 3

| Ranking | TREE searching model | LASSO searching model |
|---------|---------------------|----------------------|
| 1 | ≥9.58 hours | ≥9.58 hours |
| 2 | ≥2.86 hours | ≥2.84 hours |
| 3 | ≥2.84 hours | ≥2.86 hours |
| ... | ... | ... |

As shown in Table 3, the identified results from the TREE searching model and the TPGA searching are the same, and their reliance index ($RI_f$) is 0.742 (greater than 0.7), and thus the results are good. Hereafter, actual data are used to confirm that "OS-to-SS queue time ≥9.58 hours" is the root cause of the yield loss. when the values of OS-to-SS queue time of 96 lots are segmented by 9.58 hours that is used as a dividing point, there are 74 lots below 9.58 hours, with high resistance occurring in 13 lots out of 74, and the abnormality rate is 17%; and there are 22 lots above 9.58 hours, including 11 lots of high resistance, the abnormality rate is 50%. Thus, "OS-to-SS queue time ≥9.58 hours" happens, the high resistance rate increases significantly, and it implies that the root cause of yield loss due to high resistance is "OS-to-SS queue time ≥9.58 hours". Thereafter, a notice is issued to relevant departments (such as FDC system) to modify the "OS-to-SS queue time" for improve yield loss.

It is understood that the method for identifying root causes of a yield loss is performed by the aforementioned steps. A computer program of the present disclosure stored on a non-transitory tangible computer readable recording medium is used to perform the method described above. The aforementioned embodiments can be provided as a computer program product, which may include a machine-readable medium on which instructions are stored for programming a computer (or other electronic devices) to perform a process based on the embodiments of the present disclosure. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present disclosure also can be downloaded as a computer program product, which may be transferred from a remote computer to a requesting computer by using data signals via a communication link (such as a network connection or the like).

It is also noted that the present disclosure also can be described in the context of a manufacturing system. Although the present disclosure may be implemented in semiconductor fabrication, the present disclosure is not limited to implementation in semiconductor fabrication and may be applied to other manufacturing industries, in which the manufacturing system is configured to fabricate workpieces or products including, but not limited to, microprocessors, memory devices, digital signal processors, application specific integrated circuits (ASICs), or other similar devices. The present disclosure may also be applied to workpieces or manufactured products other than semiconductor devices, such as vehicle wheels, screws. The manufacturing system includes one or more processing tools that may be used to form one or more products, or portions thereof, in or on the workpieces (such as wafers). Persons of ordinary skill in the art should appreciate that the processing tools may be implemented in any number of entities of any type, including lithography tools, deposition tools, etching tools, polishing tools, annealing tools, machine tools, and the like. In the embodiments, the manufacturing system also includes one or more metrology tools, such as scatterometers, ellipsometers, scanning electron microscopes, and the like.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A method for identifying root causes of a yield loss, the method comprising:
   providing a production line comprising a plurality of process stages, each of the process stages comprising a plurality of process tools, each of the process tools comprising at least one process device, each of the at least one process device having a plurality of process parameters configured for processing one of a plurality of workpieces;
   identifying a plurality of inter-tool parameters between the process tools, wherein each of the inter-tool parameters represents an interaction between two of the process tools;
   processing the workpieces according to a plurality of production routes respectively, each of the production routes indicating a predetermined device of the process devices of the process tools in the process stages for processing one of the workpieces;
   performing metrology on each of the workpieces after being processed by its corresponding predetermined device, thereby obtaining a plurality of sets of in-line metrology values corresponding to the workpieces;
   performing at least one yield test on each of the workpieces after passing through the production line, thereby obtaining a plurality of sets of final inspection values corresponding to the workpieces respectively;
   determining if a yield test failure is encountered according to the sets of final inspection values;
   performing a first phase when the yield test failure is encountered, the first phase comprising:
      preparing a first searching model based on a first algorithm, wherein the first algorithm is a triple phase orthogonal greedy algorithm (TPOGA), a least absolute shrinkage and selection operator (LASSO) algorithm or a regression tree algorithm;
      obtaining a set of interaction data indicating whether the workpieces pass through or are produced by using both of any two elements of a first assembly consisting of the process devices, the process parameters and the inter-tool parameters, according to the production routes, the process parameters and the inter-tool parameters; and
      identifying at least one first key process device, and/or at least one first key process parameter, and/or at least one first key inter-tool parameter, and/or at least one first key interaction that are likely to cause the yield test failure by feeding the sets of final inspection values of the workpieces, the sets of in-line metrology values of the workpieces, the production routes of the workpieces, the process parameters, the inter-tool parameters, the set of interaction data into the first searching model; and
   when the result of identifying is good, sending at least one updated configuration to the at least one first key process device or devices related to the at least one first key process parameter, the at least one first key inter-tool parameter or the at least one first key interaction for continuous improvements of yield of the production line.

2. The method of claim 1, wherein the first phase further comprises:
   preparing a second searching model based on a second algorithm that is different from the first algorithm, wherein the second algorithm is the triple phase orthogonal greedy algorithm (TPOGA), the least absolute shrinkage and selection operator (LASSO) algorithm or the regression tree algorithm;
   identifying at least one second key process device, and/or at least one second key process parameter, and/or at least one second key inter-tool parameters, and/or at least one second key interaction that are likely to cause the yield test failure by feeding the sets of final inspection values of the workpieces, the sets of in-line metrology values of the workpieces, the production routes of the workpieces, the process parameters, the inter-tool parameters, the set of interaction data into the second searching model;
ranking and scoring the at least one first key process device, and/or the at least one first key process device, and/or the at least one first key inter-tool parameters, and/or the at least one first key interaction, thereby obtaining a first ranking list;
ranking and scoring the at least one second key process device, and/or the at least one second key process device, and/or the at least one second key inter-tool parameters, and/or at least one second key interaction, thereby obtaining a second ranking list;
comparing similarities of between the first ranking list and the second ranking list, thereby obtaining a first reliance index to gauge a reliance level of identified results;
in a condition that the first reliance index is greater than a first threshold, sending the at least one updated configuration to the at least one first key process device or the devices related to the at least one first process parameter, the at least one first key inter-tool parameter or the at least one first key interaction for continuous improvements of yield of the production line.

3. The method of claim 1, further comprising:
after the first phase, performing a second phase, the second phase comprising:
selecting a first parameter from a second assembly consisting of the at least one first key process parameter and the at least one first key inter-tool parameter, the first parameter having a plurality of values used for processing the parameters;
using each of the values of the first parameter as a reference value to obtain a set of threshold data indicating whether the values of the first parameter are greater than or equal to the reference value;
identifying a plurality of first threshold values of the first parameter that are likely to cause the yield test failure by feeding the sets of final inspection values of the workpieces, the sets of in-line metrology values of the workpieces, and the set of threshold data into the first searching model; and
when the result of identifying the first threshold values of the first parameter is good, providing the at least one updated configuration based on the first threshold values.

4. The method of claim 3, wherein the second phase further comprises:
preparing a second searching model based on a second algorithm that is different from the first algorithm, wherein the second algorithm is the triple phase orthogonal greedy algorithm (TPOGA), the least absolute shrinkage and selection operator (LASSO) algorithm or the regression tree algorithm;
identifying a plurality of second threshold values of the first parameter that are likely to cause the yield test failure by feeding the sets of final inspection values of the workpieces, the sets of in-line metrology values of the workpieces, and the set of threshold data into the second searching model;
ranking and scoring the first threshold values of the first parameter;
ranking and scoring the second threshold values of the first parameter; and
comparing similarities of rankings between the first threshold values and the second threshold values, thereby obtaining a second reliance index to gauge a reliance level of identified results; and
in a condition that the second reliance index is greater than a second threshold, providing the at least one updated configuration based on the first threshold values.

5. The method of claim 1, wherein performing metrology on each of the workpieces comprises performing virtual metrology on each of the workpieces.

6. A method for identifying root causes of a yield loss occurring in a production line comprising a plurality of process stages, each of the process stages comprising at least one process tool, each of the at least one process tool comprising at least one process device, each of the at least one process device having a plurality of process parameters configured for processing one of a plurality of workpieces, the method comprising:
identifying a plurality of inter-tool parameters between the process tools, wherein each of the inter-tool parameters represents an interaction between two of the process tools;
obtaining a plurality of production routes each of which indicates a predetermined device of the process devices of the process tools in the process stages for processing one of the workpieces;
receiving a plurality of sets of in-line metrology values of the workpieces, wherein the sets of in-line metrology values are obtained by performing metrology on the workpieces after being processed by their predetermined devices;
receiving a plurality of sets of final inspection values corresponding to the workpieces, wherein the sets of final inspection values are obtained by performing at least one yield test on each of the workpieces after passing through the production line;
determining if a yield test failure is encountered according to the final inspection values;
performing a first phase when the yield test failure is encountered, the first phase comprising:
preparing a first searching model based on a first algorithm, wherein the first algorithm is a triple phase orthogonal greedy algorithm (TPOGA), a least absolute shrinkage and selection operator (LASSO) algorithm or a regression tree algorithm;
obtaining a set of interaction data indicating whether the workpieces pass through or are produced by using both of any two elements of a first assembly consisting of the process devices, the process parameters and the inter-tool parameters, according to the production routes, the process parameters and the inter-tool parameters; and
identifying at least one first key process device, and/or at least one first key process parameter, and/or at least one first key inter-tool parameter, and/or at least one first key interaction that are likely to cause the yield test failure by feeding the sets of final inspection values of the workpieces, the sets of in-line metrology values of the workpieces, the production routes of the workpieces, the process parameters, the inter-tool parameters, the set of interaction data into the first searching model; and
when the result of identifying is good, sending at least one updated configuration to the at least one first key process device or devices related to the at least one first key process parameter, the at least one first key inter-tool parameter or the at least one first key interaction for continuous improvements of yield of the production line.

7. The method of claim 6, wherein the first phase further comprises:
preparing a second searching model based on a second algorithm that is different from the first algorithm, wherein the second algorithm is the triple phase orthogonal greedy algorithm (TPOGA), the least absolute shrinkage and selection operator (LASSO) algorithm or the regression tree algorithm;
identifying at least one second key process device, and/or at least one second key process parameter, and/or at least one second key inter-tool parameters, and/or at least one second key interaction that are likely to cause the yield test failure by feeding the sets of final inspection values of the workpieces, the sets of in-line metrology values of the workpieces, the production routes of the workpieces, the process parameters, the inter-tool parameters, the set of interaction data into the second searching model;
ranking and scoring the at least one first key process device, and/or the at least one first key process device, and/or the at least one first key inter-tool parameters, and/or the at least one first key interaction, thereby obtaining a first ranking list;
ranking and scoring the at least one second key process device, and/or the at least one second key process device, and/or the at least one second key inter-tool parameters, and/or the at least one first key interaction, thereby obtaining a second ranking list;
comparing similarities of between the first ranking list and the second ranking list, thereby obtaining a first reliance index to gauge a reliance level of identified results;
in a condition that the first reliance index is greater than a first threshold, sending the at least one updated configuration to the at least one first key process device or the devices related to the at least one first key process parameter, the at least one inter-tool parameter or the at least one first key interaction for continuous improvements of yield of the production line.

8. The method of claim 6, further comprising:
after the first phase, performing a second phase, the second phase comprising:
selecting a first parameter from a second assembly consisting of the at least one first key process parameter and the at least one first key inter-tool parameter, the first parameter having a plurality of values used for processing the parameters;
using each of the values of the first parameter as a reference value to obtain a set of threshold data indicating whether the values of the first parameter are greater than or equal to the reference value;
identifying a plurality of first threshold values of the first parameter that are likely to cause the yield test failure by feeding the sets of final inspection values of the workpieces, the sets of in-line metrology values of the workpieces, and the set of threshold data into the first searching model; and
when the result of identifying the first threshold values of the first parameter is good, providing the at least one updated configuration based on the first threshold values.

9. The method of claim 8, wherein the second phase further comprises:

preparing a second searching model based on a second algorithm that is different from the first algorithm, wherein the second algorithm is the triple phase orthogonal greedy algorithm (TPOGA), the least absolute shrinkage and selection operator (LASSO) algorithm or the regression tree algorithm;
identifying a plurality of second threshold values of the first parameter that are likely to cause the yield test failure by feeding the sets of final inspection values of the workpieces, the sets of in-line metrology values of the workpieces, and the set of threshold data into the second searching model;
ranking and scoring the first threshold values of the first parameter;
ranking and scoring the second threshold values of the first parameter; and
comparing similarities of rankings between the first threshold values and the second threshold values, thereby obtaining a second reliance index to gauge a reliance level of identified results; and
in a condition that the second reliance index is greater than a second threshold, providing the at least one updated configuration based on the first threshold values.

10. The method of claim 6, wherein the sets of in-line metrology values are obtained by performing virtual metrology on the workpieces after being processed by their predetermined devices.

11. A system for identifying root causes of a yield loss occurring in a production line comprising a plurality of process stages, each of the process stages comprising at least one process tool, each of the at least one process tool comprising at least one process device, each of the at least one process device having a plurality of process parameters configured for processing one of a plurality of workpieces, wherein there are a plurality of inter-tool parameters between the process tools, each of the inter-tool parameters representing an interaction between two of the process tools, the system comprising:
a memory storing production information and a plurality of sets of final inspection values corresponding to the workpieces, the production information including a plurality of production routes, values of the process parameters, values of the inter-tool parameters and a plurality of sets of in-line metrology values of the workpieces, wherein each of the production routes indicates a predetermined device of the process devices of the process tools in the process stages for processing one of the workpieces, the sets of in-line metrology values are obtained by performing metrology on the workpieces promptly after being processed by their predetermined devices, and the sets of final inspection values are obtained by performing at least one yield test on each of the workpieces after passing through the production line;
a processor configured to:
determine if a yield test failure is encountered according to the final inspection values; and
perform a first phase when the yield test failure is encountered, the first phase comprising:
preparing a first searching model based on a first algorithm, wherein the first algorithm is a triple phase orthogonal greedy algorithm (TPOGA), a least absolute shrinkage and selection operator (LASSO) algorithm or a regression tree algorithm;
obtaining a set of interaction data indicating whether the workpieces pass through or are produced by using both of any two elements of a first assembly consisting of the process devices, the process parameters and the inter-tool parameters, according to the production routes, the process parameters and the inter-tool parameters; and identifying at least one first key process device, and/or at least one first key process parameter, and/or at least one first key inter-tool parameter, and/or at least one first key interaction that are likely to cause the yield test failure by feeding the sets of final inspection values of the workpieces, the sets of in-line metrology values of the workpieces, the production routes of the workpieces, the process parameters, the inter-tool parameters, the set of interaction data into the first searching model; and when the result of identifying is good, send at least one updated configuration to the at least one first key process device or devices related to the at least one first key process parameter, the at least one first key inter-tool parameter or the at least one first key interaction for continuous improvements of yield of the production line.

12. The system of claim 11, wherein the first phase further comprises:

preparing a second searching model based on a second algorithm that is different from the first algorithm, wherein the second algorithm is the triple phase orthogonal greedy algorithm (TPOGA), the least absolute shrinkage and selection operator (LASSO) algorithm or the regression tree algorithm;

identifying at least one second key process device, and/or at least one second key process parameter, and/or at least one second key inter-tool parameters, and/or at least one second key interaction that are likely to cause the yield test failure by feeding the sets of final inspection values of the workpieces, the sets of in-line metrology values of the workpieces, the production routes of the workpieces, the process parameters, the inter-tool parameters, the set of interaction data into the second searching model;

ranking and scoring the at least one first key process device, and/or the at least one first key process device, and/or the at least one first key inter-tool parameters, and/or the at least one first key interaction, thereby obtaining a first ranking list;

ranking and scoring the at least one second key process device, and/or the at least one second key process device, and/or the at least one second key inter-tool parameters, and/or the at least one second key interaction, thereby obtaining a second ranking list; and comparing similarities of between the first ranking list and the second ranking list, thereby obtaining a first reliance index to gauge a reliance level of identified results; and in a condition that the first reliance index is greater than a first threshold, the processor is configured to send the at least one updated configuration to the at least one first key process device or the devices related to the at least one first key process parameter, the at least one first key inter-tool parameter or the at least one first key interaction for continuous improvements of yield of the production line.

13. The system of claim 11, wherein, after the first phase, the processor configured to perform a second phase, the second phase comprises:

selecting a first parameter from a second assembly consisting of the at least one first key process parameter and the at least one first key inter-tool parameter, the first parameter having a plurality of values used for processing the parameters;

using each of the values of the first parameter as a reference value to obtain a set of threshold data indicating whether the values of the first parameter are greater than or equal to the reference value; and identifying a plurality of first threshold values of the first parameter that are likely to cause the yield test failure by feeding the sets of final inspection values of the workpieces, the sets of in-line metrology values of the workpieces, and the set of threshold data into the first searching model; and when the result of identifying the first threshold values of the first parameter is good, the processor is configured to provide the at least one updated configuration based on the first threshold values.

14. The system of claim 13, wherein the second phase further comprises:

preparing a second searching model based on a second algorithm that is different from the first algorithm, wherein the second algorithm is the triple phase orthogonal greedy algorithm (TPOGA), the least absolute shrinkage and selection operator (LASSO) algorithm or the regression tree algorithm;

identifying a plurality of second threshold values of the first parameter that are likely to cause the yield test failure by feeding the sets of final inspection values of the workpieces, the sets of in-line metrology values of the workpieces, and the set of threshold data into the second searching model;

ranking and scoring the first threshold values of the first parameter;

ranking and scoring the second threshold values of the first parameter; and comparing similarities of rankings between the first threshold values and the second threshold values, thereby obtaining a second reliance index to gauge a reliance level of identified results; and in a condition that the second reliance index is greater than a second threshold, the processor is configured to provide the at least one updated configuration based on the first threshold values.

15. The system of claim 11, wherein the sets of in-line metrology values are obtained by performing virtual metrology on the workpieces after being processed by their predetermined devices.

* * * * *